(12) United States Patent
Harada et al.

(10) Patent No.: US 8,392,520 B2
(45) Date of Patent: Mar. 5, 2013

(54) MOBILE COMMUNICATION APPARATUS

(75) Inventors: Kanae Harada, Tokyo (JP); Akemi Toyokura, Tokyo (JP); Takashi Goto, Tokyo (JP); Takashi Ichinose, Tokyo (JP); Takushiro Haneda, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 218 days.

(21) Appl. No.: 12/563,448

(22) Filed: Sep. 21, 2009

(65) Prior Publication Data

US 2010/0077054 A1 Mar. 25, 2010

(30) Foreign Application Priority Data

Sep. 22, 2008 (JP) ................................ 2008-242987

(51) Int. Cl.
*G06F 15/16* (2006.01)
(52) U.S. Cl. ........................................ 709/207; 709/206
(58) Field of Classification Search .................. 709/206, 709/207
See application file for complete search history.

(56) References Cited

U.S. PATENT DOCUMENTS

| | | | |
|---|---|---|---|
| 6,721,402 B2 | 4/2004 | Usami | |
| 6,934,738 B1 * | 8/2005 | Furusawa et al. | 709/206 |
| 7,865,559 B1 * | 1/2011 | Day | 709/206 |
| 2001/0049725 A1 * | 12/2001 | Kosuge | 709/206 |
| 2002/0013815 A1 * | 1/2002 | Obradovich et al. | 709/204 |
| 2002/0120705 A1 * | 8/2002 | Schiavone et al. | 709/207 |
| 2002/0178228 A1 * | 11/2002 | Goldberg | 709/206 |
| 2005/0091431 A1 * | 4/2005 | Olodort et al. | 710/72 |
| 2007/0168430 A1 * | 7/2007 | Brun et al. | 709/206 |
| 2008/0016168 A1 * | 1/2008 | Noonan et al. | 709/206 |
| 2008/0065736 A1 * | 3/2008 | Gross | 709/207 |
| 2008/0126951 A1 * | 5/2008 | Sood et al. | 715/752 |
| 2008/0134084 A1 * | 6/2008 | Clark et al. | 715/808 |

FOREIGN PATENT DOCUMENTS

| | | |
|---|---|---|
| JP | 11-187067 A | 7/1999 |
| JP | 2000-222306 A | 8/2000 |
| JP | 2000-276412 A | 10/2000 |
| JP | 2002-318770 A | 10/2002 |
| JP | 2005-115424 A | 4/2005 |
| JP | 2006-338527 A | 12/2006 |

OTHER PUBLICATIONS

JP Office Action mailed on Sep. 4, 2012 as received in application No. 2008-242987.

* cited by examiner

Primary Examiner — Kevin Bates
Assistant Examiner — Robert B McAdams
(74) Attorney, Agent, or Firm — Maschoff Gilmore & Israelsen

(57) ABSTRACT

A controller of a mobile communication apparatus, such as a cellular phone, that determines whether a received email is urgent by comparing words and phrases contained in the received email with keywords and phrases in a database. The controller generates notice information, such as an icon, when the received email is determined to be urgent, so that a user can recognize that there is an email whose sender wants to contact the user. When the notice information is selected by manipulating a key input device, the controller makes a communication with the sender of the received email.

15 Claims, 21 Drawing Sheets

| No | REPLY KEYWORD |
|---|---|
| 1 | you must reply |
| 2 | please reply |
| 3 | please email me |
| 4 | email me |
| . | . |
| . | . |
| . | . |
| . | . |

Fig. 5

| No | DEADLINE KEYWORD |
|---|---|
| 1 | within XX days |
| 2 | within XX hours |
| 3 | by XX |
| 4 | by tomorrow |
| 5 | within this week |
| . | . |
| . | . |

Fig. 8

| No | SENDER EMAIL ADDRESS | THE NUMBER OF SENT REPLY EMAILS | AVERAGE REPLY TIME (min.) |
|---|---|---|---|
| 1 | aaa@ooo.co.jp | 102 | 10 |
| 2 | bbb@△△△.ne.jp | 16 | 1440 |
| 3 | ccc@□□□.co.jp | 47 | 180 |
| . | . | . | . |
| . | . | . | . |
| . | . | . | . |

Fig. 9

| No | CALLBACK KEYWORD |
|---|---|
| 1 | give me a phone call |
| 2 | please call me |
| 3 | waiting for a phone call |
| 4 | · |
| · | · |
| · | · |
| · | · |
| · | · |

Fig. 15

| No | SENDER MAIL ADDRESS | THE NUMBER OF PHONE CALLS IN REPLY TO EMAILS | AVERAGE REPLY TIME (min.) |
|---|---|---|---|
| 1 | aaa@○○○.co.jp | 5 | 50 |
| 2 | bbb@△△△.ne.jp | 20 | 160 |
| 3 | ccc@□□□.co.jp | 13 | 1360 |
| . | . | . | . |
| . | . | . | . |
| . | . | . | . |

Fig. 18

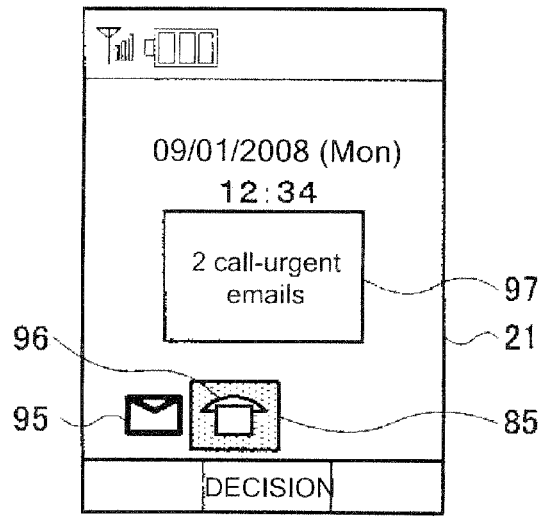
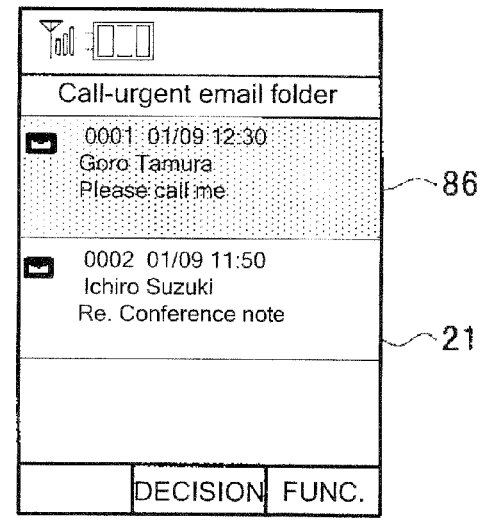
Fig. 20A          Fig. 20B
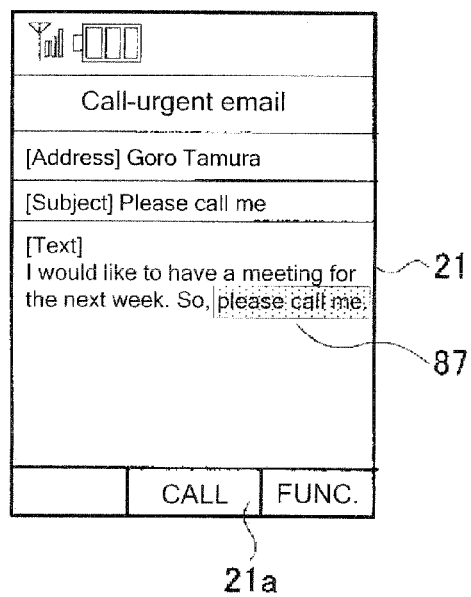
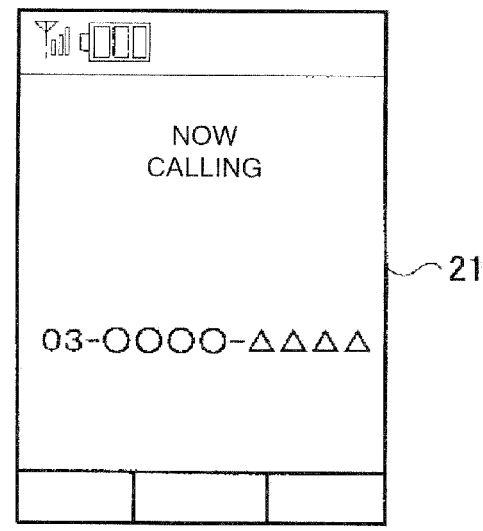
Fig. 20C          Fig. 20D

MOBILE COMMUNICATION APPARATUS

CROSS-REFERENCE TO RELATED APPLICATIONS

This application is based upon and claims the benefit of priority from Japanese Patent Application No. 2008-242987, filed Sep. 22, 2008, the entire contents of which are incorporated herein by reference.

BACKGROUND OF THE INVENTION

1. Field of the Invention

The present invention relates to a mobile communication apparatus which receives an email and informs a user of reception with various methods according to the received email.

2. Description of the Related Art

In recent years, an information processing apparatus, such as a cellular phone, generally has a function to exchange emails with other apparatuses. Especially, a portable apparatus such as the cellular phone has become popular since the portable apparatus is able to exchange emails with other apparatuses anywhere a user wants.

When a cellular phone receives an email, a user opens the email and reads messages in it. Then, when the user recognizes that the sender of the email needs to get a reply email or contact the user, the user composes an email and sends it to the sender.

However, even if a sender of an email needs to get a reply email, if a recipient misses the email or misunderstands a message in the email, the sender never receives the reply email from the recipient.

For example, Jpn. Pat. Appln. KOKAI Publication No. 2000-276412 (Nobukiyo) discloses an apparatus which selects a reply deadline from a memory based on a key word contained in a received email, and informs a user of the reply deadline with various LEDs in accordance with the selected reply deadline.

However, the prior art does not consider displaying the content of a mail or a mail creation screen smoothly from a state of lighting the LED.

BRIEF SUMMARY OF THE INVENTION

It is one object of the present invention to provide a mobile communication apparatus which enables a user to recognize the presence of an urgent email whose sender wants to contact the recipient and to create a reply email easily.

According to one aspect of the present invention, a mobile communication apparatus includes: an interface configured to communicate with a base station; a display unit configured to display information; an input device configured to input instructions; a memory unit configured to store emails, and a keyword database including at least one keyword or phrase; a control unit configured to compare each word and phrase in a message in a received email with the at least one keyword or phrase in the keyword database, determine that the received email is an urgent email if the message includes at least one word or phrase coinciding with the at least one keyword or phrase in the keyword database, display notice information on the display unit if the received email is determined to be urgent, and perform a communication with a sender of the received email when the displayed first notice information is selected via the key input device.

BRIEF DESCRIPTION OF THE SEVERAL VIEWS OF THE DRAWING

The accompanying drawings, which are incorporated in and constitute a part of the specification, illustrate exemplary embodiments of the invention, and together with the general description given above and the detailed description of the exemplary embodiments given below, serve to explain the principles of the invention.

FIG. 5 shows an example of a reply keyword database;

FIG. 8 shows an example of a deadline keyword database;

FIG. 9 shows an example of a reply time database;

FIG. 15 shows an example of a callback keyword database;

FIG. 18 shows an example of a deadline keyword database;

FIGS. 20A-20D show a screen transition when making a phone call; and

DETAILED DESCRIPTION OF THE INVENTION

Exemplary embodiments of the present invention will be described hereinafter with reference to the accompanying drawings.

First Embodiment

Figure 1:
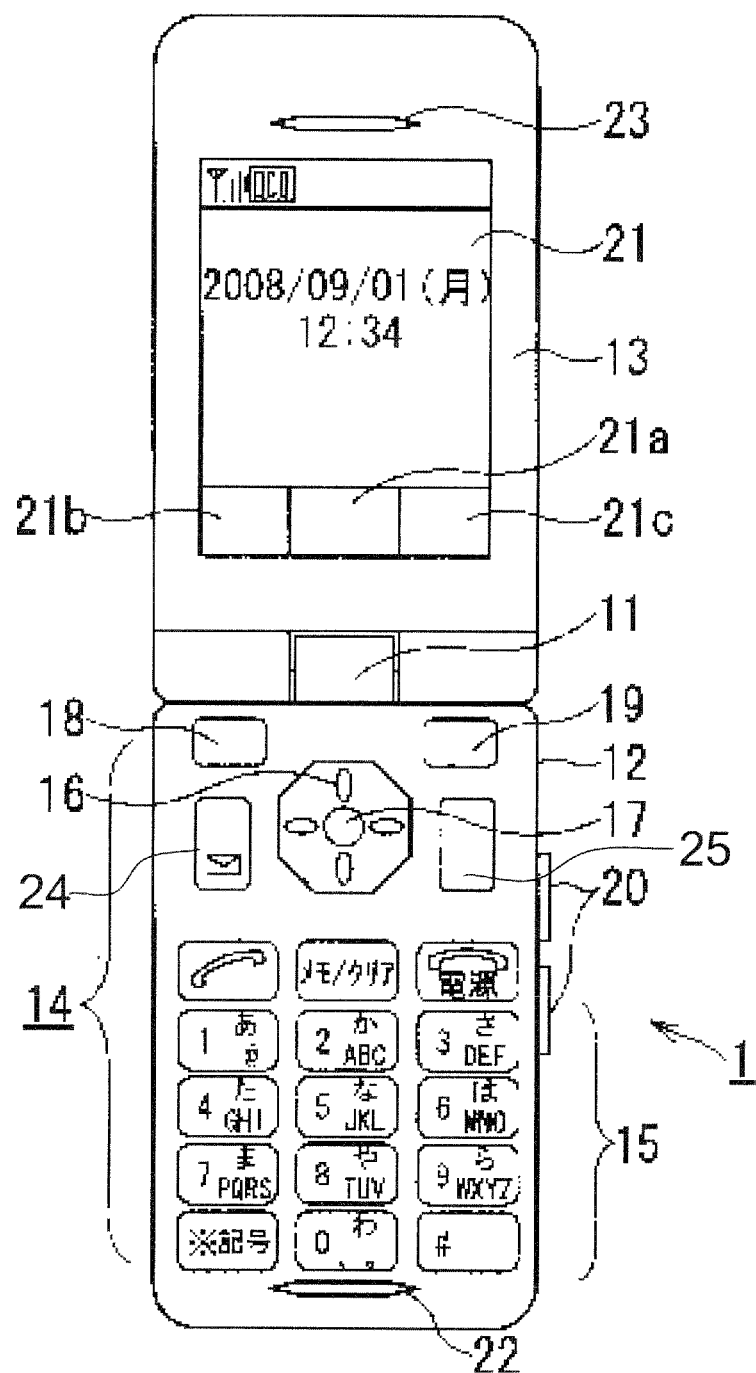
FIG. 1 shows an exemplary appearance of a cellular phone.

FIG. 1 shows an exemplary arrangement of a cellular phone 1. As shown in FIG. 1, the cellular phone 1 is composed of a first housing 12 and a second housing 13, and both housings are rotatably connected via a hinge unit 11. An antenna is placed inside of the cellular phone 1, and the cellular phone 1 performs wireless communication with a base station via the antenna.

On a front surface of the first housing 12, there is arranged an operation key unit 14 composed of digit keys 15 each assigned 0 through 9 and so on, a call key, a redial key, an end/power key, a clear key, and a menu key. Various instructions can be inputted via the operation key unit 14.

Also, the operation key unit 14 includes an arrow key 16 and an enter-key 17 at an upper portion of the first housing 12. The arrow key 16 allows for inputting in four directions, and a cursor displayed on a display unit 21 is moved from side to side and up and down by manipulating the arrow key 16. For example, the arrow key is used to scroll through a telephone directory, a content of an email, and web information displayed on the display unit 21.

The enter-key 17 is used to select functions. For example, if, by manipulating the arrow key 16, an intended option is highlighted (or otherwise focused on) in a menu or an intended telephone number is highlighted (or otherwise focused on) in a directory list displayed on the display unit 21, a user can make an outgoing call simply by pressing the enter-key 17. A function displayed on an area 21*a* is also assigned to the enter-key 17.

Furthermore, there is a first soft-key 18 to the left side of the arrow key 16 and a second soft-key 19 to the right side of the arrow key 16, corresponding to functions displayed on areas 21*b* and 21*c*, respectively. For example, when a received message is displayed on the display unit 21, the first soft-key 18 may function to delete the displayed message and the second soft-key 19 may function to register the sender's email in a phonebook database. A mail application is run if the mail-key 24 is depressed and a web browsing application is run if the browsing-key 25 is depressed. Also, side-keys 20 for manipulating the cellular phone 1 are installed on the side surface of the cellular phone 1. For example, the side-keys 20 are used to adjust the volume level.

There is a microphone 22 below the operation key unit 14 on the first housing 12, and speech communication is captured by the microphone 22.

A battery is inserted into a battery compartment on a back side of the cellular phone 1, and electric power is supplied to circuits from the battery when the cellular phone 1 is turned on by pressing the end/power key of the operation key unit 14.

On the other hand, the display unit 21 is located on a front surface of the second housing 13 and a reception condition, a remaining battery level, a content of an email, a browsed internet page, and so on, are displayed on the display unit 21. The display unit 21 may be a LCD (Liquid Crystal Display), OLED (Organic Light Emitting Display), or ILED (Inorganic Light Emitting Display). A sub-display for displaying the reception condition and the remaining battery level may be installed on the back surface of the second housing 13.

There is a speaker (receiver) 23 above the display unit 21 and, for example, a voice from an intended party (the party on the other end of a communication) is outputted from the speaker 23. Also, there may be a speaker in the cellular phone 1, from which, for example, the voice from the intended party on the other end of the call is outputted when a video-phone communication is made.

Figure 2:
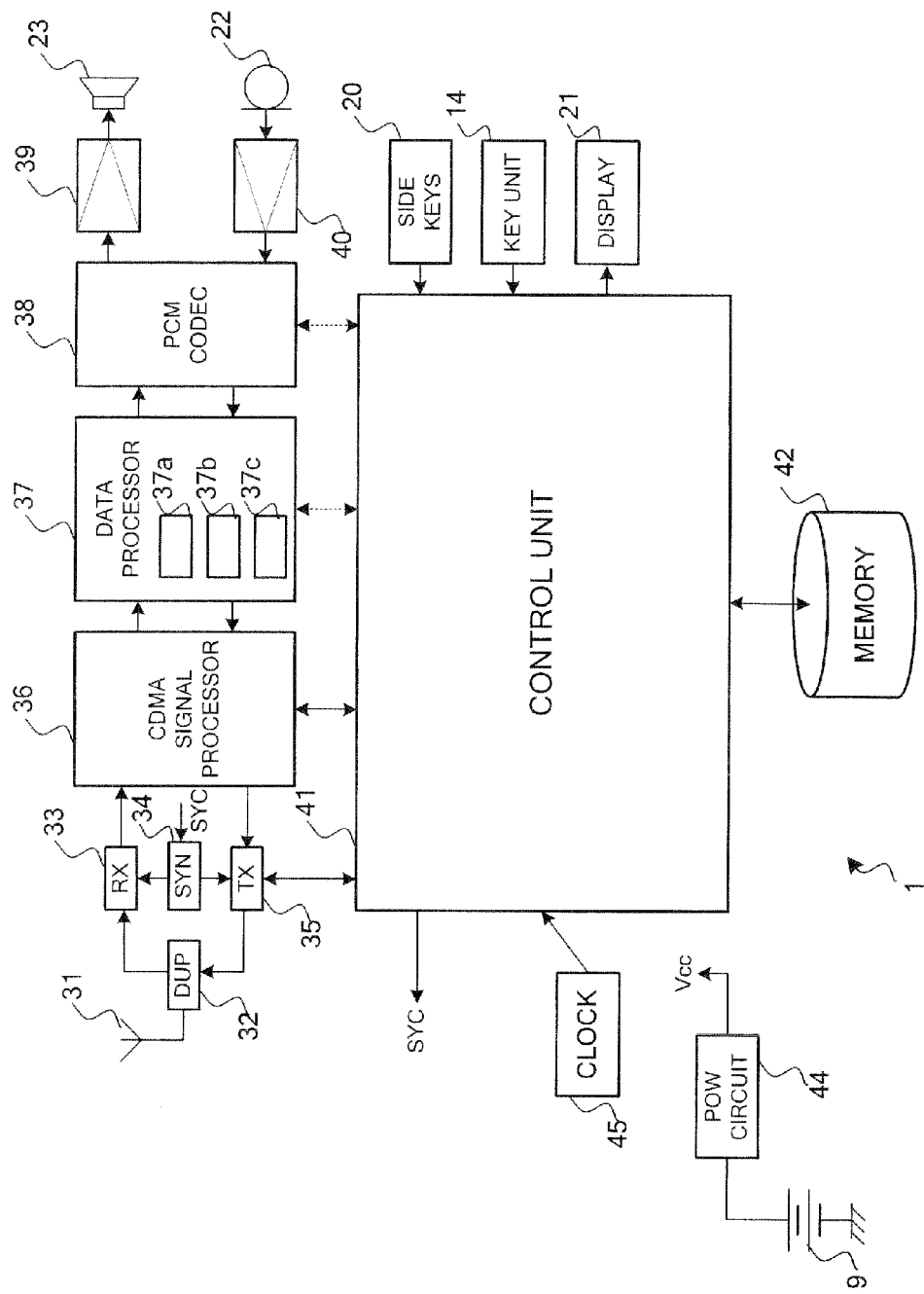
FIG. 2 is a block diagram of the cellular phone according to a first embodiment.

FIG. 2 shows an inside constitution of the cellular phone 1. A radio signal from a base station is received by an antenna 31. Subsequently, the radio signal is transferred to a reception circuit (RX) 33 via a duplexer (DUP) 32. The RX 33 down-converts the radio signal to an intermediate frequency signal by mixing with a local frequency signal outputted from a synthesizer (SYN) 34. Then, the RX 33 orthogonally demodulates the intermediate frequency signal and outputs a baseband signal. The local frequency signal outputted from the SYN 34 is controlled by a control signal SYC outputted from a control unit 41.

The baseband signal outputted from the RX 33 is inputted into a CDMA signal processor 36. The CDMA signal processor 36 de-spreads the baseband signal with a spreading code and generates packet data. The packet data is inputted into a data processor 37.

The data processor 37 is composed of a multiplexer/demultiplexer (MPX/DMPX) 37*a*, video codec 37*b*, and audio codec 37*c*. The packet data from the CDMA signal processor 36 is processed by the DMPX 37*a* and reconstructed to coded video data, coded audio data, message data, such as an email data, and control data. If the reconstructed data is coded audio data, the audio codec 37*c* decodes the coded audio data according to an audio coding standard such as AAC (Advanced Audio Codec) and generates digital audio data. The digital audio data may be speech data received from an intended party or audio data contained in movie content, for example. If the reconstructed data is coded video data, the video codec 37*b* decodes the coded video data according to a video coding standard such as H.264 and generates digital video data. For example, the digital video data may be video data contained in the movie content. If the movie content is not reproduced in real time, the packet data is stored in memory unit 42. In this case, the packet data is transferred from the CDMA signal processor 36 to the control unit 41 to be stored in the memory unit 42.

The digital audio signal outputted from the data processor 37 is inputted into a PCM codec 38. The PCM codec 38 converts the digital audio signal into an analog audio signal using a Pulse Code Modulation method. The analog audio signal is outputted from the speaker 23 after being amplified by an amplifier 39.

The digital video data generated by the data processor 37 is input into the control unit 41. When the control unit 41 receives the digital video data, the control unit 41 processes the digital video data so that the digital video data is displayed on the display unit 21 via a video RAM (VRAM).

In addition, if the reconstructed data from the packet data is message data, the data processor 37 transfers the message data to the control unit 41. The control unit 41 stores the message data from the data processor 37 in the memory unit 42. Subsequently, the control unit 41, in response to an instruction input from the operation keys 14, displays the message data, stored in the memory unit 42, on the display unit 21.

In speech communication the user's voice is captured by the microphone 22 and analog audio data is generated. The analog audio data is amplified to a given level by an amplifier 40 and inputted into the PCM codec 38. Thus, the analog audio data outputted from the amplifier 40 is digitized into a digital audio data by the PCM codec 38 and inputted into the data processor 37.

Further, a message data, such as an email, generated by the control unit 41 is also inputted into the data processor 37.

The audio codec 37*c* of the data processor 37 encodes the digital audio data according to an audio coding standard, thus coded audio data is generated. In addition, the video codec 37*b* of the data processor 37 encodes the digital video data inputted from the control unit 41 according to a video coding standard, thus coded video data is generated. Thereafter, the MPX/DMPX 37*a* multiplexes the coded audio and video data, and generates packet data. The packet data is inputted into the CDMA signal processor 36. Similarly, if message data is received from the control unit 41, the MPX/DMPX 37*a* packetizes the message data into packet data.

The CDMA signal processor 36 spreads the packet data outputted from the data processor 37 with a spreading code which is assigned to a transmission channel and outputs a spread signal to transmission circuit (TX) 35. The TX modulates the spread signal according to a digital modulation method such as QPSK (Quadrature Phase Shift Keying) and thereafter up-converts the modulated spread signal by mixing with a local frequency signal generated by the SYN 34. Then, a radio signal is generated by the TX 35. After the radio signal is amplified into a given level by the TX 35, the radio signal is transmitted to the base station via the DUP 32 and the antenna 31.

The control unit 41 may be composed of a CPU (Central Processing Unit), a ROM (Read Only Memory), a RAM (Random-Access Memory), and so on. The CPU executes a program stored in the ROM and an application program loaded into the RAM from the memory unit 42, and controls a plurality of circuits and units so that the control unit 41 controls the cellular phone 1 overall. The RAM also stores data used by the CPU to execute processing. Incidentally, the control unit 41 may include a vide RAM which temporarily stores digital video data to be displayed on the display unit 21

The memory 42 is composed of a rewritable and nonvolatile memory such as a flash-memory device or a HDD (Hard Disc Drive), and stores application programs and data executed by the CPU of the control unit 41 and data.

A power circuit 44 generates a given voltage Vcc from a rechargeable battery 9 and supplies the given voltage Vcc to a plurality of circuits and units.

The cellular phone 1 is equipped with a clock circuit 45 for providing the control unit 41 and the circuits and so on with clock information.

Figure 3:
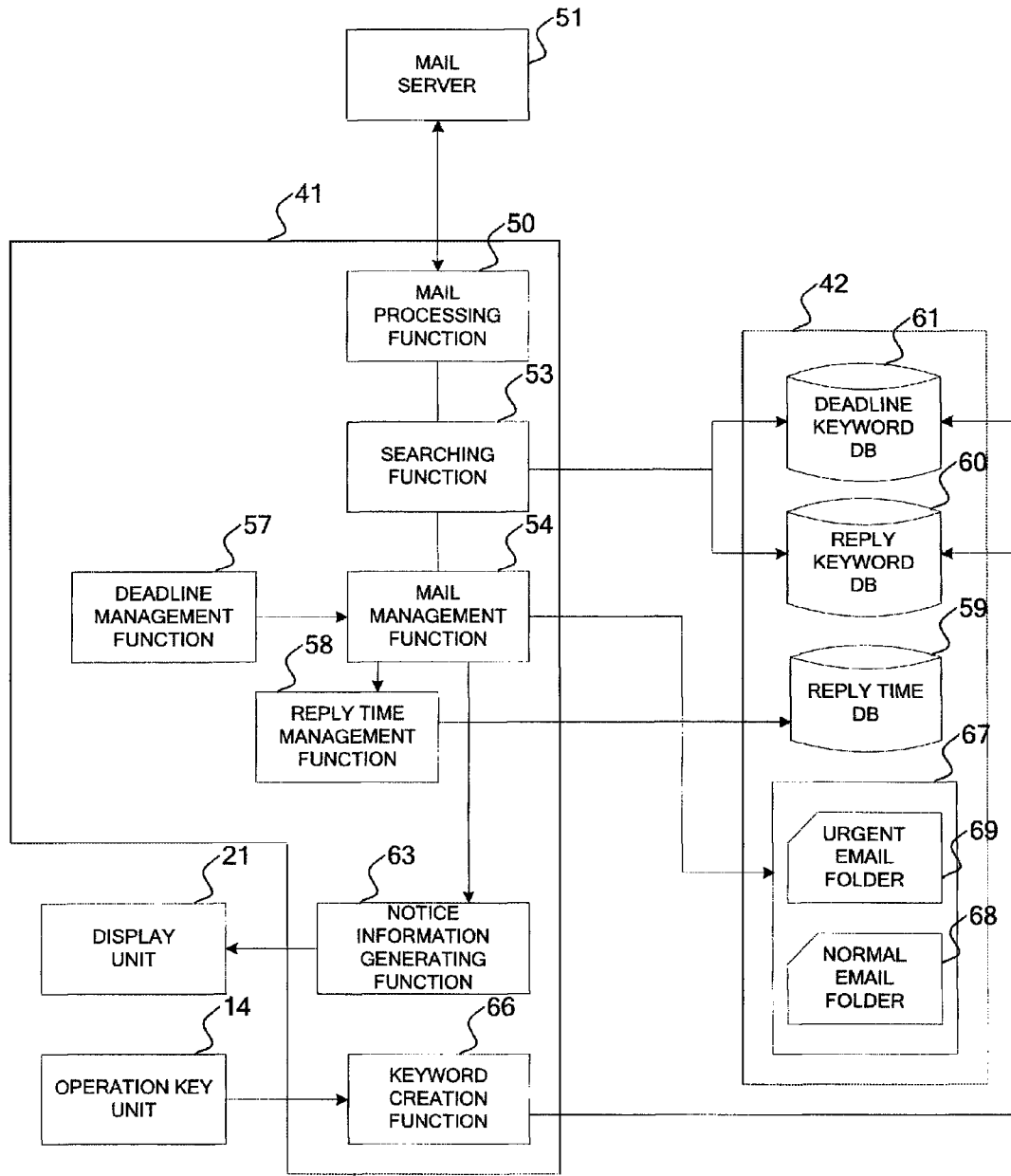
FIG. 3 is a functional block diagram of a control unit of the cellular phone.

FIG. 3 shows a functional diagram of the cellular phone 1 according to the first embodiment. Generally, each function is executed by the control unit 41.

A mail processing function 50 is a function to transmit an email via the antenna 31 and receive an email from a mail server 51 via a base station and the antenna 31. When receiving an email, the mail processing function 50 transfers the received email to a searching function 53.

The searching function 53 is a function to search whether the email from the mail processing function 50 includes any keywords or phrases registered in a reply keyword database 60 or a deadline keyword database 61. If it is detected that the email is transferred (e.g., forwarded) by a sender of the received email, the searching function 53 may ignore any messages, which the sender did not create, from the search for the keyword or phrase. Namely, the searching function 53 compares words in a message created by the sender with the reply database 60 and the deadline database 61. For example, the searching function 53 determines that the received email is transferred when detecting a specific keyword, such as "Following content is a transferred message", in the received email, and the searching function 53 may disregard the transferred message when searching for the keywords or phrases.

A mail management function 54 is a function to entirely manage received emails. Especially, the mail management function 54 determines whether a sender of an email is requesting that a reply email be sent based on the result of the search by the searching function 53. Hereinafter, an email in which a sender is requesting that a reply email be sent is called "urgent email" and other email is called "normal email".

Also, the email management function 54 has a function to assign a reply deadline to the urgent email, store the urgent email into an urgent email folder 69 and the normal email into a normal email folder 68 in an email folder 67, display an urgent email list and an email creation screen on the display unit 21, and check whether a reply email has been sent by the deadline for each urgent email based on a signal from a deadline management function 57. A time and date of receipt of the email may be stored together with the normal email and the urgent email in the normal email folder 68 and the urgent email folder 69, respectively.

The deadline management function 57 is a function to check whether the deadline has elapsed based on the clock information from the clock circuit 45.

A reply time management function 58 is a function to calculate a reply time from the time and date of receipt of the urgent email to a time and date of transmission of a reply email, calculate an average reply time for each sender email address based on the calculated reply time, a recent average reply time and a number of transmissions of the reply email stored in a reply time database 59, and update the average reply time in the reply time database 59 by the calculated average reply time. If no average reply time for a newly calculated reply time is stored in the reply time database 59, the newly calculated reply time and a sender email address are stored in a new entry of the reply time database 59.

A notice information generating function 63 is a function to generate a given notice information displayed on the display unit 21 based on whether a received email is an urgent email or a normal email, or when a deadline has elapsed. The given notice information may be an icon which is selectable by a user, and if the icon is selected by manipulating the operation key unit 14, an urgent email list, a normal email list, or an elapsed urgent email list may be displayed on the display unit 21.

A keyword creation function 66 is a function to generate a keyword to be stored in the reply keyword database 60 and/or the deadline keyword database 61. Also, in accordance with an input via the operation key unit 14, the keyword creation function 66 may delete a keyword from the reply keyword database 60 and/or the deadline keyword database 61, and edit a keyword in the reply keyword database 60 and/or the deadline keyword database 61. In this case, the keyword is displayed on the display unit 21 for deletion or editing.

Figure 4:
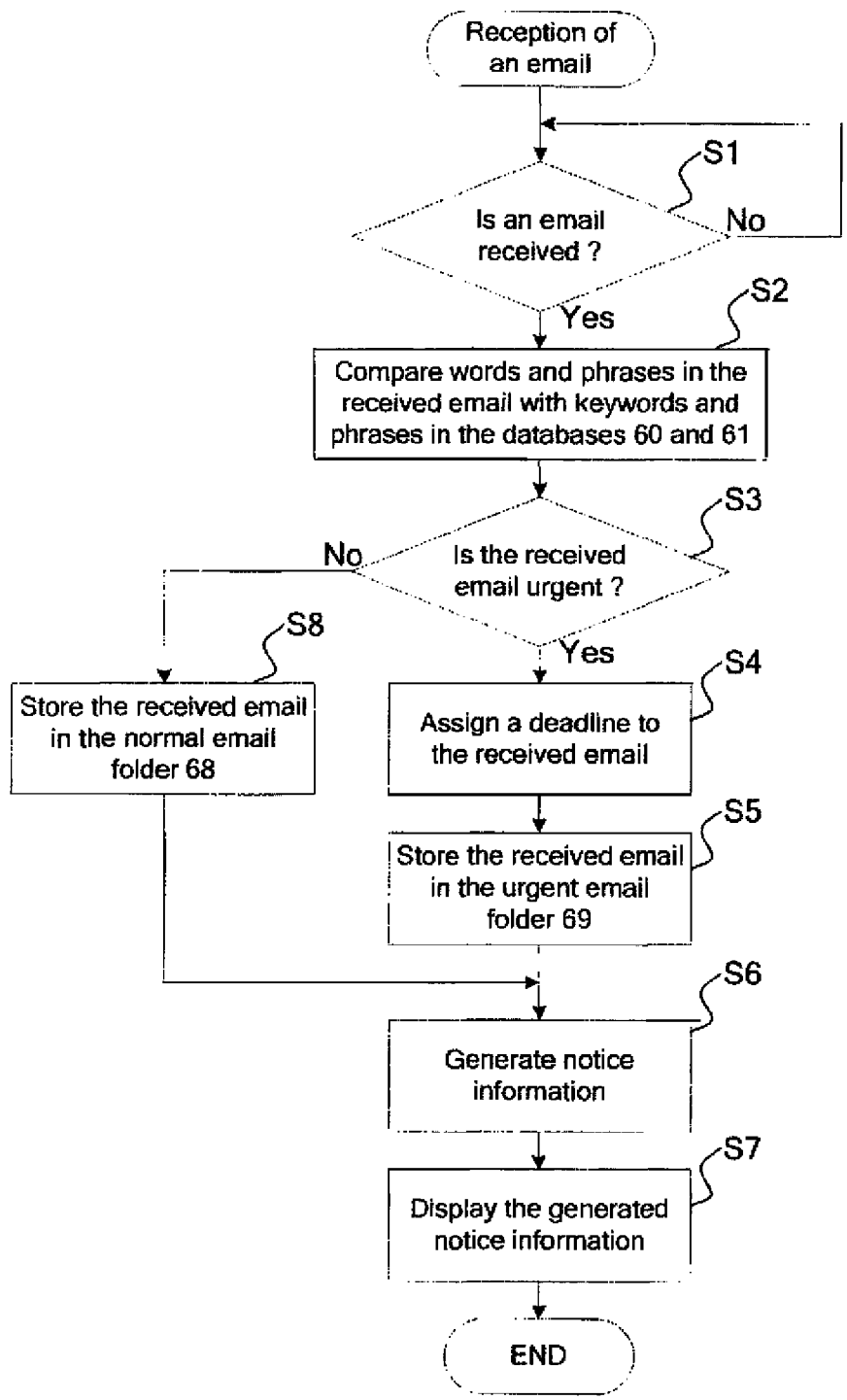
FIG. 4 is a flowchart for explaining processing of reception of an email.

Next, a process when the cellular phone 1 receives an email will be explained with reference to FIG. 4.

In step S1, the mail processing function 50 keeps checking whether an email is received from the mail server 51. If an email is received from the mail server 51, in step S2, the searching function 53 receives the email from the mail processing function 50 and compares keywords in the reply keyword database 60 and deadline keyword database 61 with words in the received email.

FIG. 5 shows an example of the reply keyword database 60. As shown in FIG. 5, the reply keyword database 60 stores a plurality of keywords, such as "you must reply", "please reply", "please email me", "email me" and so on.

In step S3, the mail management function 54 determines whether the received email, is an urgent email based on the comparison executed by the searching function 53. If the received email is a normal email, the mail management function 54 stores the email in the normal email folder 68, in step S8. On the other hand, if the received email is an urgent email, the main management function 54 assigns a deadline to the email determined as the urgent email, in step S4. An explanation about how to estimate the deadline will be described later with reference to FIG. 7.

Thereafter, the mail management function 54 stores the email in the urgent email folder 69, in step S5.

When the mail management function 54 stores an email in the urgent email folder 69 or the normal email folder 68, a time and date of receipt of the email may be stored with the email.

In step S6, the notice information generating function 63 generates notice information in accordance with the determination regarding whether the received email is the urgent email or the normal email. The notice information may be a pop-up, window type, an icon type, a ticker type, or a pictographic character type. For example, when the pop-up window type or the ticker type is adopted as the notice information, the pop-up window or the ticker field in which a message, such as "THE NUMBER OF URGENT EMAILS: XX", is displayed is generated. If the icon type is adopted as the notice information, the number of urgent emails is displayed in a pop-up window or a ticker field, when a cursor is pointed to the icon. Or, if the pop-up window or the ticker field is already displayed on the display unit 21, the number of urgent emails is updated. Incidentally, the pop-up window, the ticker field, or the icon is also displayed for the normal email.

The notice information for the urgent email and the notice information for the normal email differ in shape, color, or size so that a user can recognize the notice information for the urgent email and the notice information for the normal email. For example, the urgent email is indicated by a white icon and the normal email is indicated by a yellow icon. Or, only an icon is displayed for the normal email and an icon with a pop-up window is displayed for the urgent email.

In step S7, the notice information generating function 63 displays the notice information on the display unit 21. The notice information may be displayed on the sub-display at the same time.

Figure 6B:
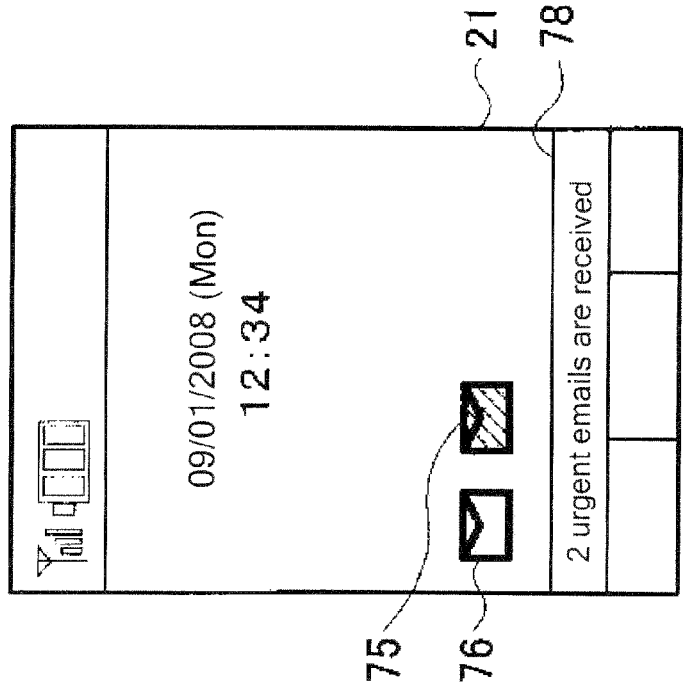
FIGS. 6A and 6B show a screen transition when displaying notice information.
Figure 6A:
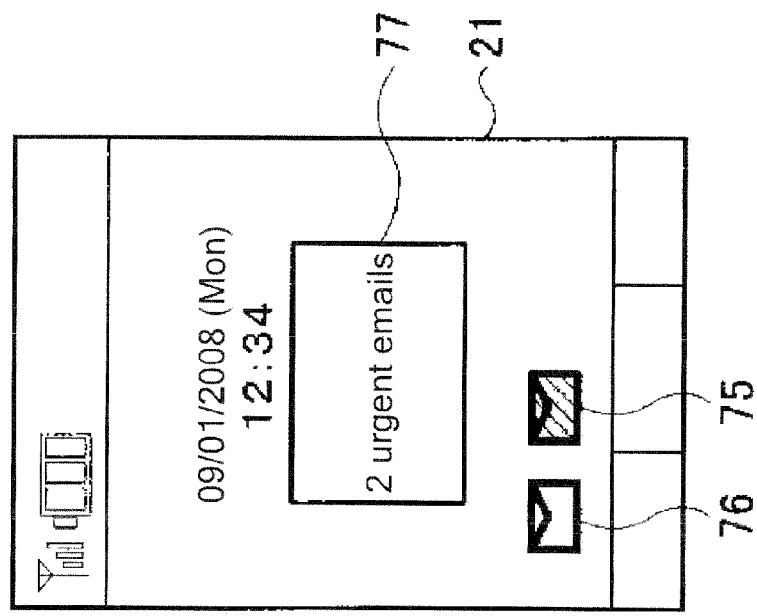

Examples of a display screen on the display unit 21 are explained with reference to FIGS. 6A and 6B. As shown in FIG. 6A, an icon 75 indicating the presence of the urgent email and an icon 76 indicating the presence of the normal email are displayed in the display screen. In this case, the icon 75 and the icon 76 differ in color. In the display screen shown in FIG. 6A, a pop-up window 77 is displayed for explaining the number of urgent emails. On the other hand, as shown in FIG. 6B, a ticker field 78 may be displayed in place of the pop-up window 77. Also, in FIGS. 6A and 6B, the icon 75 is highlighted so that a user easily recognizes the presence of the urgent email.

Figure 7:
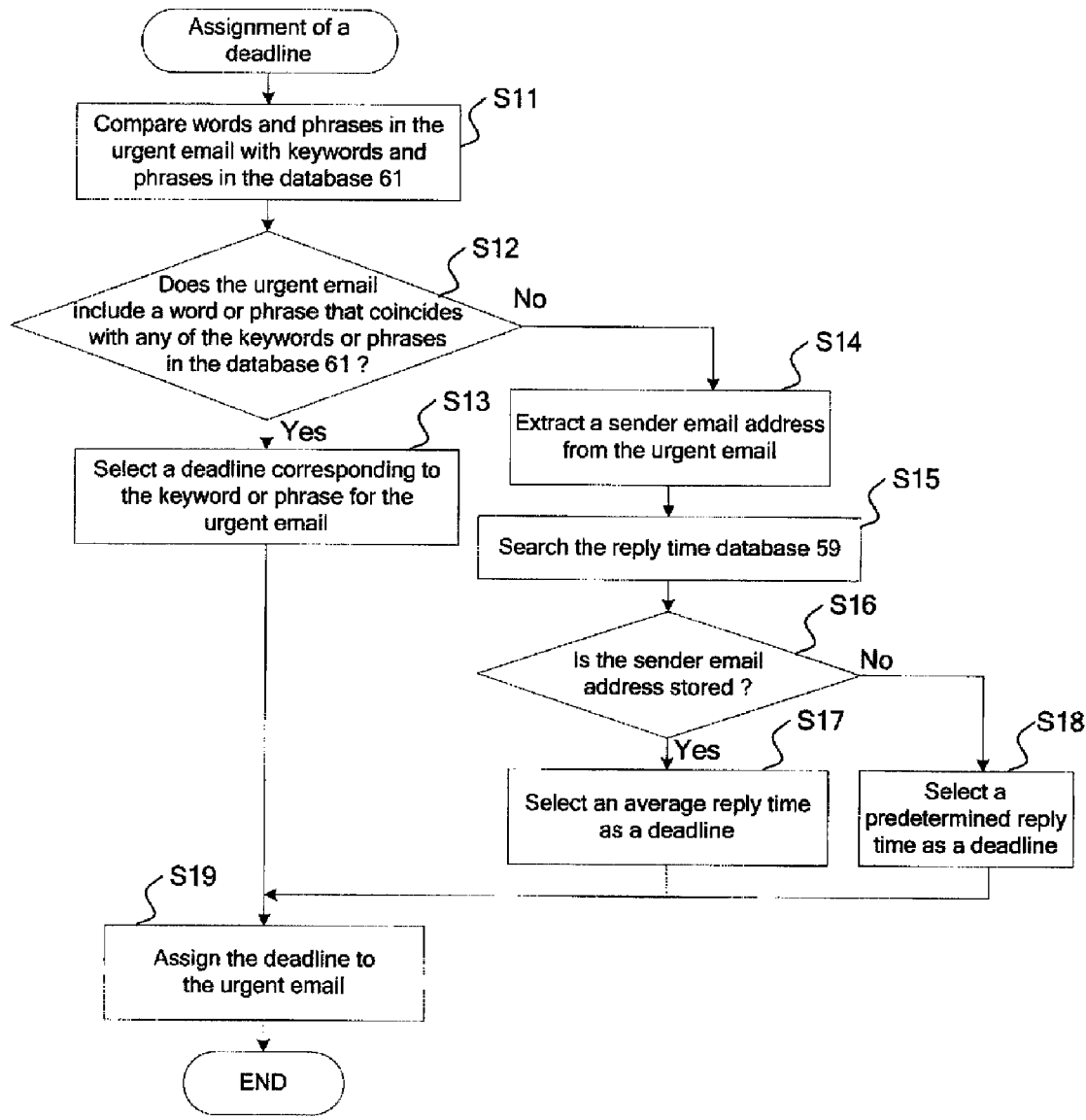
FIG. 7 is a flowchart for explaining processing of assigning a deadline to an email.
Figure 10:
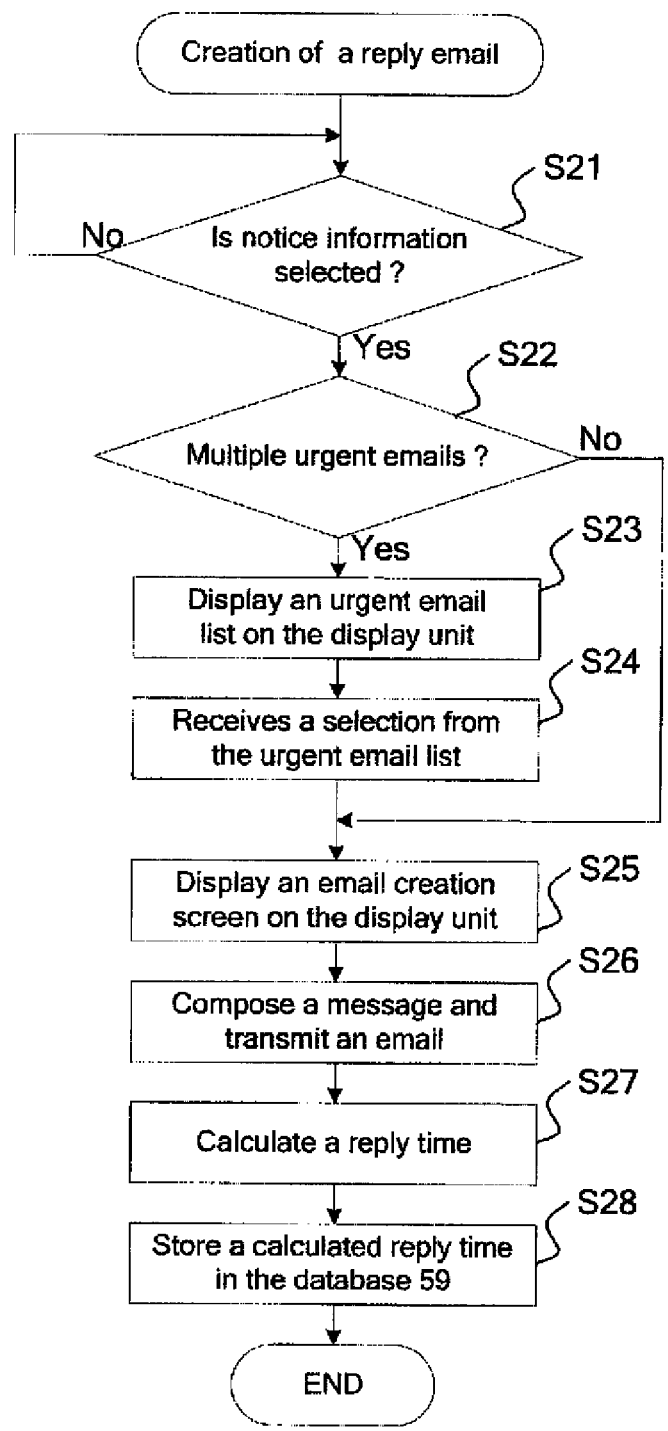
FIG. 10 is a flowchart for explaining processing of creating a reply email.

Next, with reference to FIG. 7, a process regarding how a deadline is assigned to an urgent email will be explained.

In step S11, the searching function 53 checks whether the received email determined as an urgent email includes a keyword or a phrase that coincides with any keywords or phrases registered in the deadline keyword database 61. As described above, if the received email is transferred from a sender, the searching function 53 may compare each word or phrase in a message created by the sender (i.e., excluding words or phrases in the message transferred by the sender) with the keywords or the phrases in the deadline keyword database 61.

An example of the deadline keyword database 61 is explained with reference to FIG. 8. As shown in FIG. 8, in the deadline keyword database 61, a plurality of keywords and phrases, such as "within XX days", "within XX hours", and "by tomorrow", are registered. The "XX" in each phrase indicates arbitrary digit(s), and the digits may be searched together with the other word(s) in the each phrase.

In step S12, the mail management function 54 determines whether the urgent email includes a keyword or a phrase that, coincides with any of the keywords or phrases in the deadline keyword database 61 based on a result of the comparison by the searching function 53. If it is determined that the urgent email includes the keyword or the phrase, in step S13, a deadline corresponding to the keyword or the phrase is selected for the urgent email. For example, if the urgent email includes the phrase, "by tomorrow", then the mail management function 54 sets one day after a reception day of the urgent email as a deadline. If the urgent email includes the phrase, "within 3 days", then the mail management function 54 sets three days after a reception day of the urgent email as a deadline.

On the other hand, if it is determined that the urgent email does not include the keyword or the phrase, the mail management function 54 extracts a sender email address from the urgent email, in step S14. Thereafter, in step S15, the mail management function 54 searches the reply time database 59 for the extracted sender email address. If an email address which coincides with the extracted sender email address is stored in the reply time database 59, the mail management function 54 checks whether an average reply time is registered corresponding to the email address in the reply time database 59, in step S16.

If it is detected that an average reply time corresponding to the sender email address is registered in the reply time database 59, the mail management function 54 selects the average reply time as a deadline for the urgent email, in step S17. On the other hand, if it is detected that no average reply time is registered in the reply time database 59, the mail management function 54 selects a predetermined reply time, e.g. two hours, as a deadline for the urgent email.

When the deadline is assigned to the urgent email as is described above, the mail management function 54 stores the deadline together with the urgent email in the urgent email folder 69, in step S19.

FIG. 9 shows an example of the reply time database 59. As shown in FIG. 9, the reply time database 59 is composed of a plurality of sets of a sender email address, the number of reply emails sent to the sender email address, and an average reply time.

Next, a process for creating a reply email responding to an urgent email will be explained with reference to FIGS. 10 and 11A through 11C.

Figure 11A:
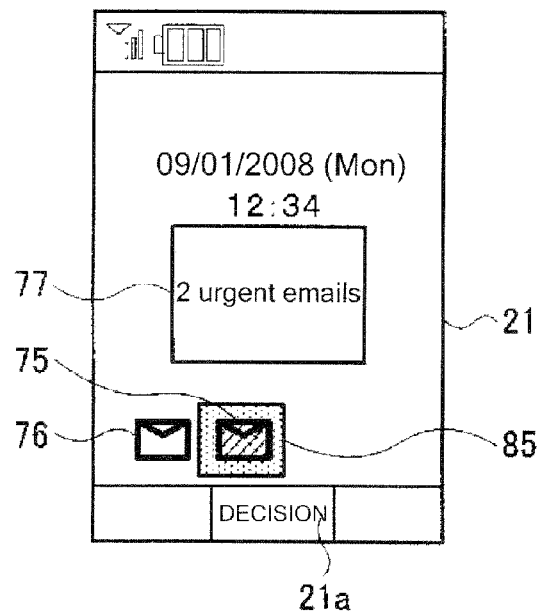
FIGS. 11A-11C show a screen transition when displaying an email creation screen.

In step S21, the mail management function 54 checks whether notice information on the display unit 21 is selected. As shown in FIG. 11A, the notice information is assumed to be an icon 75 indicating a presence of an urgent email, an icon 76 indicating a presence of a normal email, and a pop-up window 77 regarding the urgent email. To select the icon 75, a user puts a cursor 85 on the icon 75 by manipulating the arrow key 16, and depresses the enter-key 17. Or the user may put the cursor 85 on the pop-up window 77 by manipulating the arrow key 16, and depress the enter-key 17 to select the pop-up window 77. A function of the enter-key 17 is displayed in the area 21a as "DECISION". The mail management function 54 waits in step S21 until the notice information is selected.

If it is detected that the notice information is selected, the mail management function 54 further checks in step S22 whether there are multiple urgent emails in the urgent email folder 69. If a single urgent email is stored in the urgent email folder 69, the process goes to step S25.

Figure 11B:
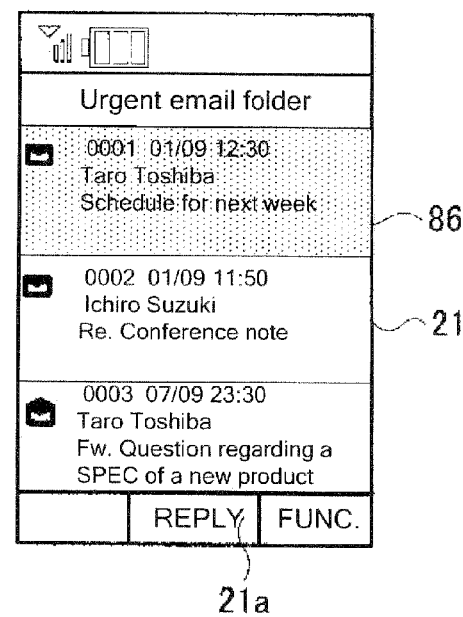

If it is detected that multiple urgent emails are stored in the urgent email folder 69, the mail management function 54 reads out an urgent email list from the urgent email folder 69 and displays the list on the display unit 21, in step S23. FIG. 11B shows an example of the urgent email list displayed on the display unit 21. As shown in FIG. 11B, a plurality of entries, each including time and date of receipt, sender's name, and a title, are displayed, and, by manipulating the arrow key 16, a cursor 86 can be moved up and down over the entries so as to select one of the entries. In this case, entries are displayed in order of their deadlines so that the user readily recognizes urgent emails which are close to their deadlines.

In step S24, the mail management function 54 waits for a selection from the urgent email list, and the process proceeds when the mail management function 54 receives a selection. As shown in FIG. 11B, the selection is performed by putting the cursor 86 on an intended one of the entries of the urgent email list and depressing the enter-key 17. When the urgent email list is displayed, a function of the enter-key 17 is displayed in the area 21a as "REPLY" (see FIG. 11B).

Figure 11C:
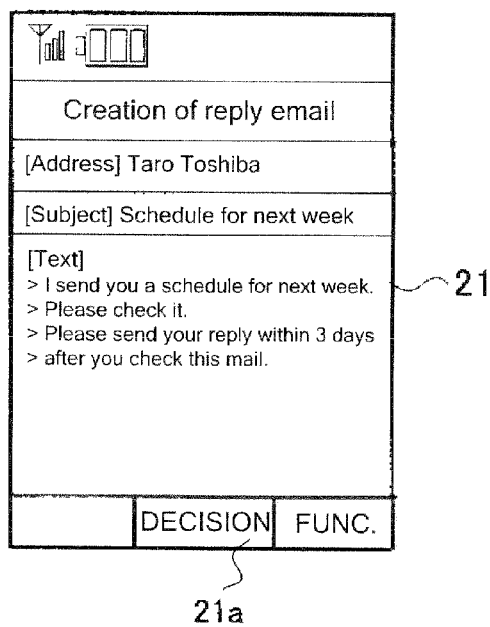

In step S25, the mail management function 54 displays an email creation screen on the display unit 21 in response to the selection in step S24. FIG. 11C shows an example of the email creation screen displayed on the display unit 21. As shown in FIG. 11C, a message contained in the urgent email is copied so that the user can create an email while checking the message contained in the urgent email.

In step S26, the mail management function 54 composes a message based on inputs via the operation key unit 14, and thereafter the mail processing function 50 transmits a created reply email to the sender of the urgent email via the base station and the mail server 51. When the reply email has been transmitted, the mail management function 54 stores sent information, showing that the reply email has been transmitted, with the urgent email so as to discriminate the urgent email to which a reply has been sent from other urgent emails to which reply emails have not been sent. Or, when the reply email has been transmitted, the mail management function 54 may move the urgent email corresponding to the sent reply email from the urgent email folder 69 to the normal email folder 68.

In step S27, the reply time management function 58, in response to the transmission of the reply email, calculates a reply time from the time and date of receipt of the urgent email to a time and date of transmission of the reply email.

In step S28, the reply time management function 58 checks whether a sender email address in the urgent email corresponding to the reply email is stored in the reply time database 59. If the sender email address is not found in the reply time database 59, the reply time management function 58 stores the calculated reply time and "1" as the number of sent reply emails together with the sender email address in the reply time database 59. On the other hand, if the sender email address is found in the reply time database 59, the reply time management function 58 reads out the stored average reply time and the number of sent reply emails corresponding to the sender email address, calculates a new average reply time as is described above, stores the new average reply time in the reply time database 59, and adds "1" to the number of sent reply emails.

Figure 12:
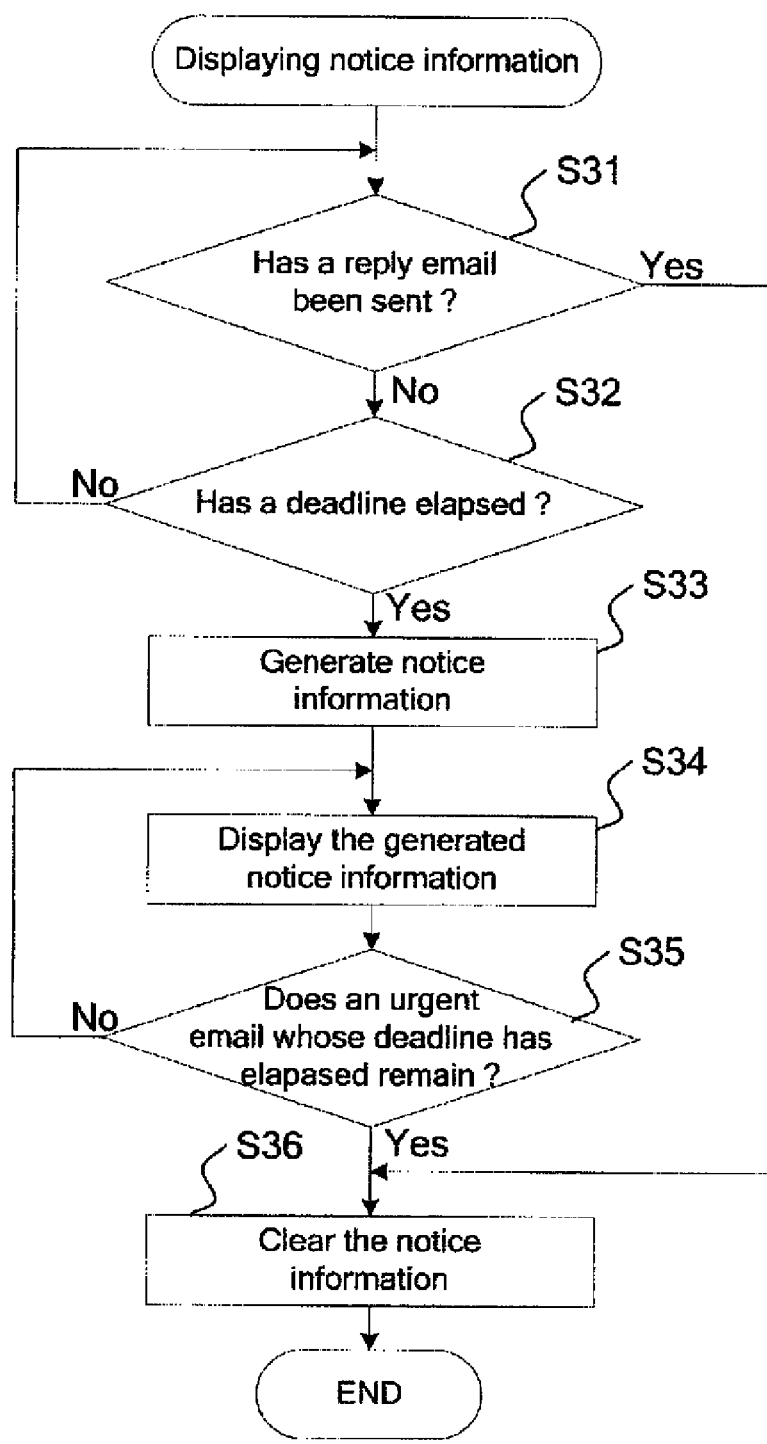
FIG. 12 is a flowchart for explaining processing of displaying notice information.

Next, with reference to FIG. 12, a process to display notice information regarding an urgent email whose deadline has elapsed will be explained.

In step S31, the mail management function 54 checks whether a reply email has been sent in reply to an urgent email in the urgent email folder 69. For example, the mail management function 54 may check whether there is sent information stored with the urgent email showing that the reply email has been transmitted. If the mail management function 54 finds that no urgent email is stored in the urgent email folder 69 or sent information is set for all urgent emails, the process goes to step S36.

On the other hand, if the mail management function 54 detects that there is at least one urgent email, whose reply email has not been transmitted, the mail management function 54 checks whether its deadline has already elapsed, in step S32. If there is no urgent email whose deadline already has elapsed, the process returns to step S31.

In step S33, when the mail management function 54 detects that there is at least one urgent email whose deadline has already elapsed, the notice information generating function 63 generates notice information, such as an icon or a pop-up window, so that the user can recognize that there is at least one urgent email whose deadline has already elapsed. For example, if the icon is adopted for notification, the icon is displayed in red so as to be distinguished from the yellow icon and the white icon is described above.

In step S34, the notice information generating function 63 displays the generated notice information on the display unit 21. The notice information may be displayed on the sub-display at the same time. Also, when the notice information (indicating that there is at least one urgent email whose deadline has already elapsed) on the display unit 21 is selected by a cursor, an email creation screen is displayed on the display unit 21.

In step S35, the mail management function 54 continues to check whether the urgent email whose deadline has already elapsed remains in the urgent email folder 69, and keeps displaying the notice information (indicating that there is at least one urgent email whose deadline has already elapsed) on the display unit 21 until no urgent email whose deadline has already elapsed is stored in the urgent email folder 69.

If the mail management function 54 detects that no urgent email whose deadline has already elapsed is stored in the urgent email folder 69, the notice information generating function 63 clears the notice information (indicating that there is at least one urgent email whose deadline has already elapsed) in step S36.

In the embodiment described above, the user can readily recognize that an urgent email has been received on the display unit 21 and can display an email creation screen with a simple manipulation. Also, when determining whether a received email is urgent or not by referring to a message created by a sender of the email even if the received email is transferred, the determination is executed with accuracy.

Also, since the user can register, delete, and edit keywords in the reply keyword database 60 and the deadline keyword database 61, the determination about whether a received email is an urgent email or a normal email and about when a deadline is can reflect the user's intent.

Furthermore, since the deadline can be determined based on the user's response history (when the deadline is not determined from the received email), the notice can be performed based on the user's history of use of the cellular phone.

Second Embodiment

Figure 13:
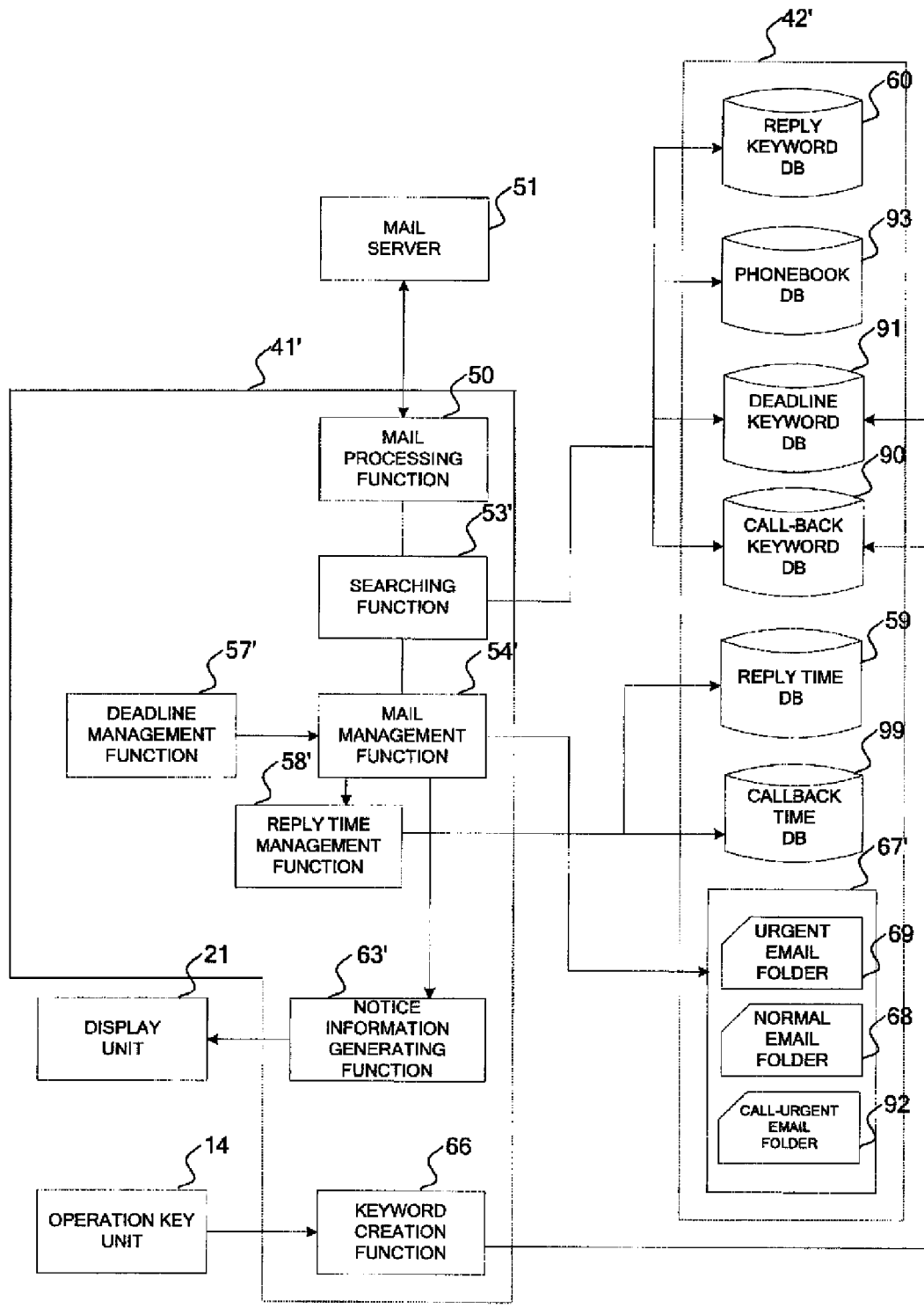
FIG. 13 is a block diagram of the cellular phone according to a second embodiment.

FIG. 13 shows a functional diagram of the cellular phone 1 according to a second embodiment.

The difference from the first embodiment is that according to the second embodiment the control unit 41' determines whether a sender of a received email is requesting that the user of the cellular phone 1 make a phone call to the sender, in addition to the features of the first embodiment. The second embodiment can also be implemented without the features for detecting an urgent email and displaying corresponding notice information (see, e.g., steps S3-S7 of FIG. 4) of the first embodiment.

FIG. 13 shows a functional diagram of the cellular phone 1 according to the second embodiment. Generally, each function is executed by the control unit 41'. The functions described above with respect to the first embodiment are assigned the same reference numerals in the description of the second embodiment, and explanations thereof will be omitted.

The searching function 53' is a function to search whether the email from the mail processing function 50 includes any keywords or phrases registered in a callback keyword database 90 or a deadline keyword database 91.

The mail management function 54' is a function to determine whether a sender of an email is requesting that the user of the cellular phone 1 make a phone call to the sender based on the result of search by the searching function 53'. Hereinafter, an email in which a sender is requesting that the user of the cellular phone 1 make the phone call to the sender, is called a "call-urgent email" and other emails may be the "urgent email" or "normal email".

Also, the email management function 54' has a function to assign a callback deadline to the call-urgent email, store the urgent email into the urgent email folder 69, the normal email into the normal email folder 68, and the call-urgent email into the call-urgent email folder 92 in an email folder 67', and generate link information between the call-urgent email and a telephone number stored in a phonebook database 93 in the memory unit 42'. A time and date of receipt of the email may be stored together with the normal email, the urgent email, and the call-urgent email in the normal email folder 68, the urgent email folder 69, and the call-urgent email folder 92 respectively.

The deadline management function 57' is a function to check whether the deadline to send a reply email or the callback deadline has elapsed based on the clock information from the clock circuit 45.

A callback time management function 94 is a function to calculate a callback time from the time and date of receipt of the call-urgent email to a time and date of a phone call to a sender of the call-urgent email, calculate an average callback time for each call-urgent email sender based on the calculated callback time, a recent average callback time and a number of phone calls to the sender of the call-urgent email stored in a callback time database 99, and update the average callback time in the callback time database 99 by the calculated average callback time. If no average callback time for a newly calculated callback time is stored in the callback time database 59, the newly calculated callback time and a sender of the call-urgent email are stored in a new entry of the callback time database 99.

A notice information generating function 63' is a function to generate a given notice information to be displayed on the display unit 21 based on whether a received email is an urgent email, a normal email, or a call-urgent email, or when a deadline has elapsed. The given notice information may be an icon which is selectable by a user, and if the icon is selected by manipulating the operation key unit 14, an urgent email list, a normal email list, a call-urgent email list, or an elapsed urgent email list may be displayed on the display unit 21.

Figure 14:
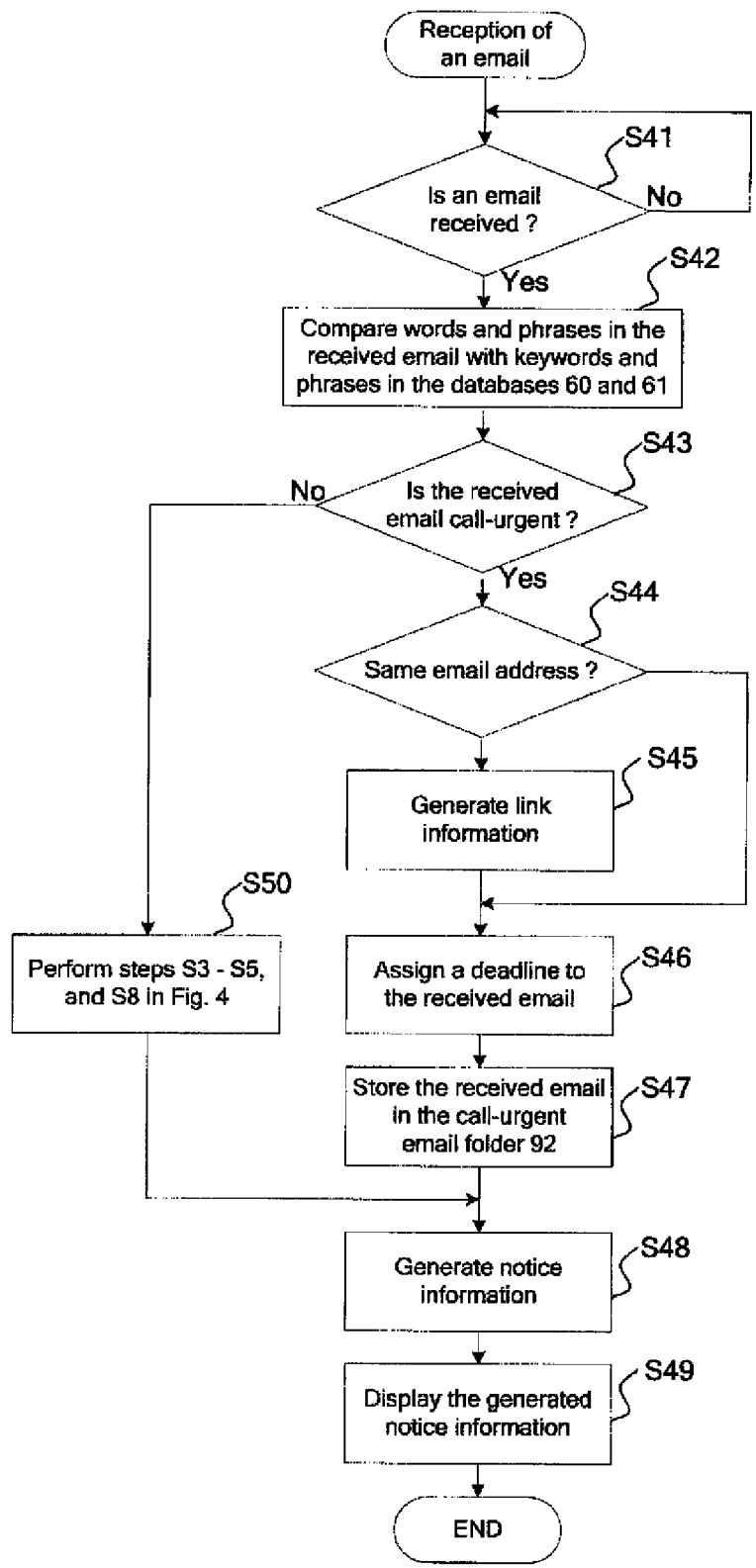
FIG. 14 a flowchart for explaining processing of reception of an email.

Next, a process when the cellular phone 1 receives an email will be explained with reference to FIG. 14.

In step S41, the mail processing function 50 keeps checking whether an email is received from the mail server 51. If an email is received from the mail server 51, in step S42, the searching function 53' receives the email from the mail processing function 50 and compares keywords in the callback keyword database 90 and the deadline keyword database 91 with words in the received email.

FIG. 15 shows an example of the callback keyword database 90. As shown in FIG. 15, the callback keyword database 90 stores a plurality of keywords, such as "give me a phone call", "please call me", "waiting for a phone call" and so on.

In step S43, the mail management function 54' determines whether the received email is a all-urgent email based on the comparison executed by the searching function 53'. If the received email is not the call-urgent email, in step S50, the mail management function 54' performs processes as are described steps S3-S5, and S8 in FIG. 4, and process goes to step S48. On the other hand, if the received email is the call-urgent email, the mail management function 54' determines that the received email is a call-urgent email.

In step S44, the main management function 54' checks whether the phonebook database 93 in the memory unit stores an email address which coincides with the sender's email address contained in the call-urgent email. If the sender's email address does not coincide with the email address contained in the call-urgent email, the process goes to S46.

On the other hand, if it is determined that there is an email address which coincides with the email address contained in the call-urgent email, the call management function 54' generates link information between the call-urgent email and a telephone number stored corresponding to the email address in the phonebook database 93, in step S45.

Thereafter, the mail management function 54' assigns a deadline to the email determined as the call-urgent, email, in step S46. An explanation about how to estimate the deadline will be described later with reference to FIG. 17.

In step S47, the mail management function 54' stores the email, or the email together with the generated link information, in the call-urgent email folder 92. An email without link information may be stored in the urgent email folder 69 as an urgent email.

In step S48, the notice information generating function 63', in response to the determination about whether the received email is the normal email, the urgent email, or the call-urgent email performed by the mail management function 54', generates notice information.

In step S49, the notice information generating function 63' displays the generated notice information on the display unit 21.

Figure 16B:
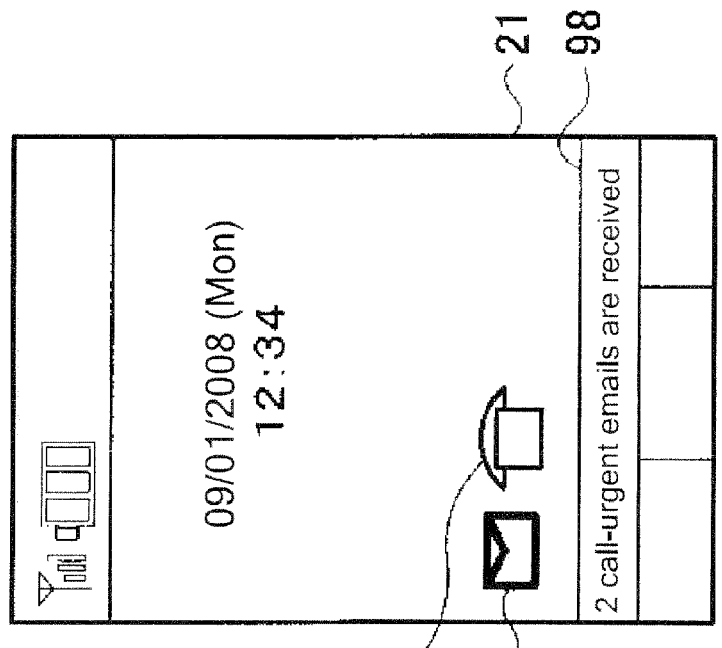
FIGS. 16A and 16B show a screen transition when displaying notice information.
Figure 16A:
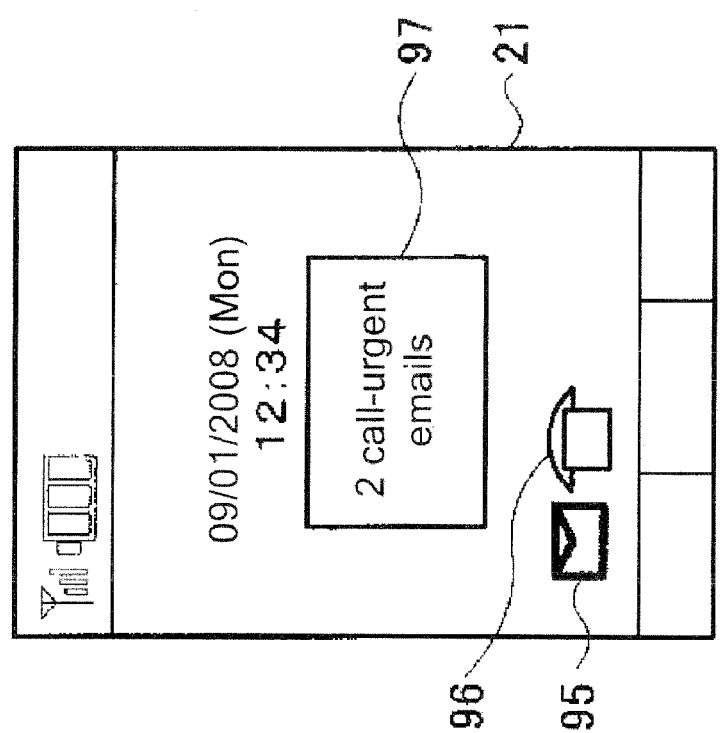

Examples of a display screen on the display unit 21 are explained with reference to FIGS. 16A and 16B. As shown in FIG. 16A, an icon 95 indicating the presence of the normal email and an icon 96 indicating the presence of the call-urgent email are displayed in the display screen. In this case, the icon 95 and the icon 96 differ in design. In the display screen shown in FIG. 16A, a pop-up window 97 is also displayed for explaining the number of call-urgent emails. On the other hand, as shown in FIG. 16B, a ticker field 98 may be displayed in place of the pop-up window 97.

Figure 17:
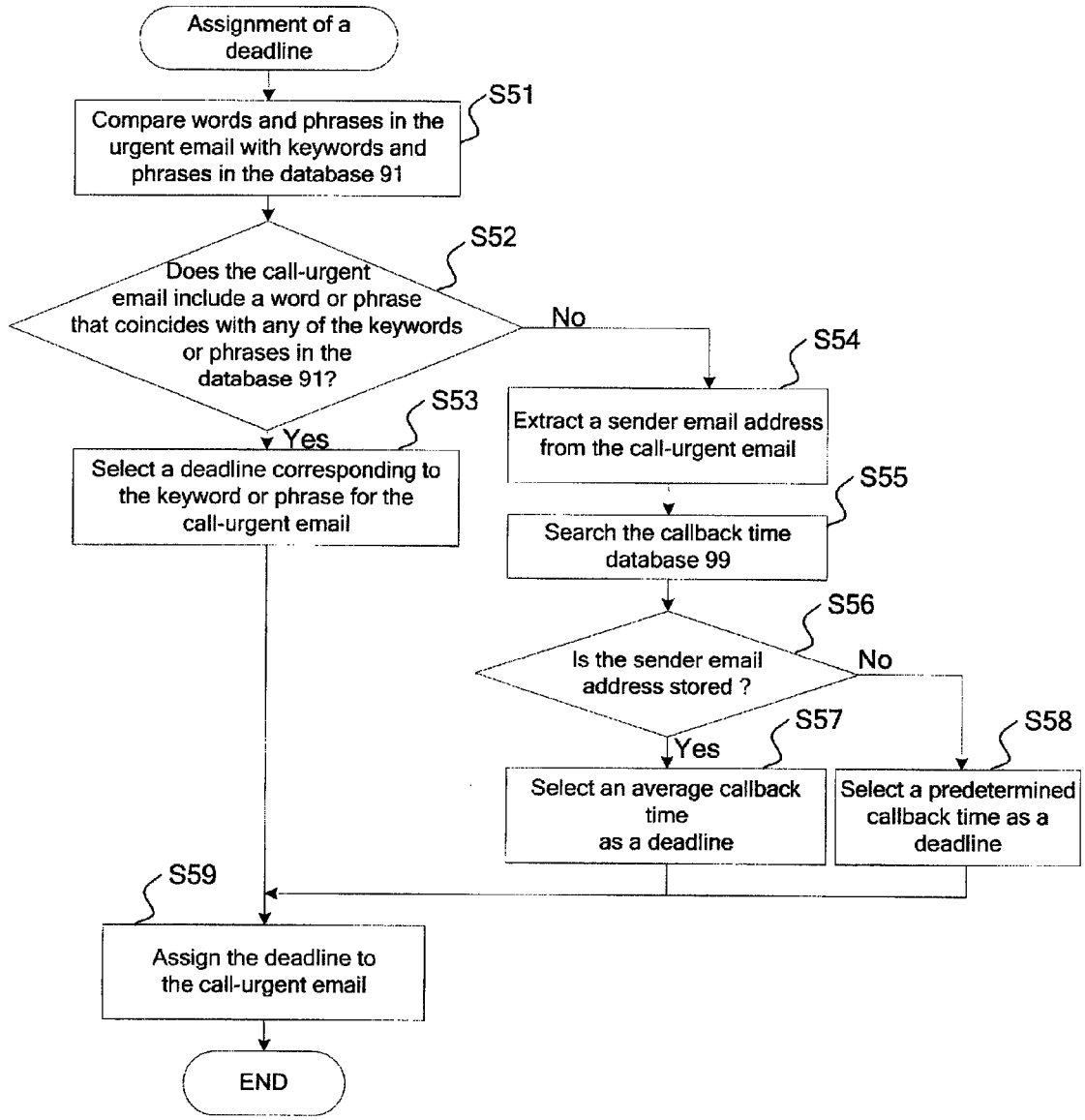
FIG. 17 is a flowchart for explaining processing of assigning a deadline to an email.
Figure 19:
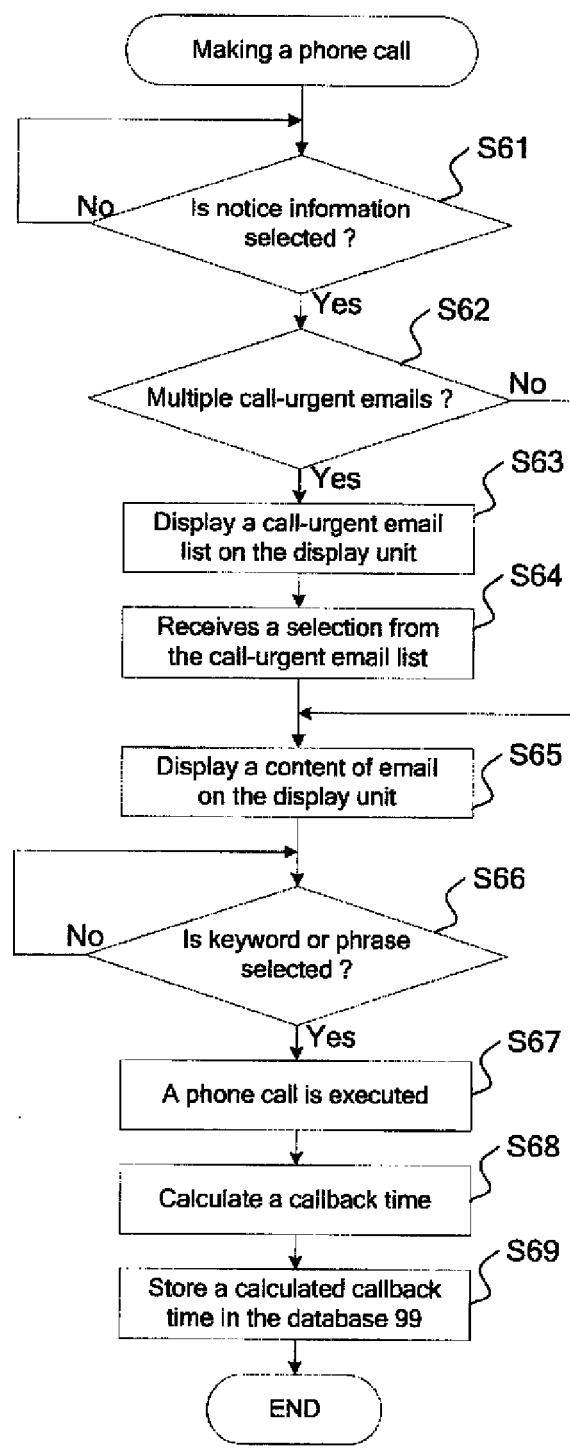
FIG. 19 is a flowchart for explaining processing of making a phone call.

Next, with reference to FIG. 17, a process regarding how a deadline is assigned to a call-urgent email will be explained.

In step S51, the searching function 53' checks whether a received email determined as a call-urgent email includes a keyword or a phrase that coincides with any keywords or phrases registered in the deadline keyword database 91. Also in this case, if the received email is transferred from a sender, the searching function 53' may compare each word or phrase in a message created by the sender (i.e., excluding words or phrases in the message transferred by the sender) with the keywords or the phrases in the deadline keyword database 91.

Here, the deadline keyword database 91 has the same structure as the deadline keyword database 60 which is explained with reference to FIG. 8. Therefore, the detailed explanation about the deadline keyword database 91 is omitted. Of course, keywords and phrases stored in the deadline keyword database 91 can be varied according to the user's intent, by using the operation key unit 14.

In step S52, the mail management function 54' determines whether the call-urgent email includes a keyword or a phrase that coincides with any of the keywords or phrases in the deadline keyword database 91 based on a result of the comparison by the searching function 53'. If it is determined that the call-urgent email includes the keyword or the phrase, in step S53, a deadline corresponding to the keyword or the phrase is assigned to the call-urgent, email. For example, if the call-urgent email includes the phrase, "by tomorrow", then the mail management function 54' sets one day after a reception day of the call-urgent email as a deadline. If the call-urgent email includes the phrase, "within 3 days", then the mail management function 54' sets three days after a reception day of the call-urgent email as a deadline.

On the other hand, if it is determined that the call-urgent email does not include the keyword or the phrase, the mail management function 54' extracts a sender email address from the call-urgent email, in step S54. Thereafter, in step S55, the mail management function 54' searches the callback time database 99 for the extracted sender email address. If an email address which coincides with the extracted sender email address is registered in the callback time database 99, the mail management function 54' checks whether an average callback time is registered corresponding to the email address in the callback time database 99, in step S56.

If it is detected that an average callback time corresponding to the sender email address is registered in the callback time database 99, the mail management function 54' sets the callback time as a deadline for the call-urgent email, in step S57. On the other hand, if it is detected that no average callback time is registered in the callback time database 99, the mail management function 54' sets a predetermined callback time, e.g. two hours, as a deadline for the call-urgent email.

When the deadline is assigned to the call-urgent email as is described above, the mail management function 54' stores the deadline together with the call-urgent email in the call-urgent email folder 92, in step S59.

FIG. 18 shows an example of the callback time database 99. As shown in FIG. 18, the callback time database 99 is composed of a plurality of sets of a sender mail address, the number of phone calls made in reply to call-urgent emails, and an average callback time.

Next, a process for making a phone call in response to a call-urgent email will be explained with reference to FIGS. 19 and 20A through 20D.

In step S61, the mail management function 54' checks whether notice information on the display unit 21 is selected. As shown in FIG. 20A, the notice information is assumed to be an icon 95 indicating a presence of a normal email, an icon 96 indicating a presence of a call-urgent email, and a pop-up window 97 regarding the call-urgent email. To select the icon 96, a user puts a cursor 85 on the icon 96 by manipulating the arrow key 16, and depresses the enter-key 17. Or the user may put the cursor 85 on the pop-up window 97 by manipulating the arrow key 16, and depress the enter-key 17 to select the pop-up window 97. A function of the enter-key 17 is displayed in the area 21a as "DECISION". The mail management function 54' waits in step S61 until the notice information is selected.

If it is detected that the notice information is selected, the mail management function 54' further checks in step S62 whether there are multiple call-urgent emails in the call-urgent email folder 92. If a single call-urgent email is stored in the call-urgent email folder 92, the process goes to step S65.

If it is detected that multiple call-urgent emails are stored in the call-urgent email folder 92, the mail management function 54' reads out a call-urgent email list from the call-urgent email folder 92 and displays the list on the display unit 21, in step S63. FIG. 20B shows an example of the call-urgent email list displayed on the display unit 21. As shown in FIG. 20B, a plurality of entries, each including time and date of receipt, sender's name, and a title, are displayed, and, by manipulating the arrow key 16, a cursor 86 can be moved up and down over the entries so as to select one of the entries.

In step S64, the mail management function 54' waits for a selection from the call-urgent email list, and the process proceeds when the mail management function 54' receives a selection. As shown in FIG. 20B, the selection is performed by putting the cursor 86 on an intended one of the entries of the call-urgent email list and depressing the enter-key 17. A function of the enter-key 17 is displayed in the area 21a as "DECISION".

In step S65, as shown in FIG. 20C, the mail management function 54' displays a content of the selected call-urgent email on the display unit 21 in response to the selection in step S24. In the content of the selected call-urgent email, a keyword or a phrase, which coincides with the keyword or the phrase in the callback keyword database 90, is surrounded with a cursor 87.

In step S66, the mail management function 54' checks whether a keyword or a phrase is selected. For example, the keyword or phrase is selected by moving the cursor 87 on an intended keyword or phrase by manipulating the arrow key 16, then depressing the enter-key 17. As shown in FIG. 20C, a function of the enter-key 17 is displayed in the area 21a as "CALL". The mail management function 54' waits in step S66 for the selection.

If a keyword or a phrase is selected, the mail management function 54' extracts link information corresponding to the displayed call-urgent email from the call-urgent email folder 92 if the link information is stored, to obtain the telephone number stored in the phonebook database 93 in the memory unit 42' that is linked to the displayed call-urgent email. If no link information corresponding to the displayed call-urgent email is stored in the call-urgent email folder 92, the mail management function 54' waits for an input of a telephone number. When the mail management function 54' obtains a telephone number, a telephone application is activated by the control unit 41' and a phone call based on the obtained telephone number is executed, in step S67. FIG. 20D shows an example of a display screen displayed while a phone call is being executed based on a telephone number obtained. After the phone call is executed, the mail management function 54' assigns call-done information indicating that a phone call has made to the call-urgent email in the call-urgent email folder 92.

in step S68, the callback time management function 94, in response to the phone call, calculate a callback time from the time and date of receipt of the call-urgent email to a time and date of the phone call. In step S69, the callback time management function 92 checks whether the sender of the call-urgent email is stored in the callback time database 99. If no sender is found in the callback time database 99, the callback time management function 94 stores the calculated callback time and "1" as a number of phone calls made in reply to call-urgent emails together with the sender of the call-urgent email in the callback time database 99. On the other hand, if the sender of the call-urgent email is found in the callback time database 99, the callback time management function 94 reads out the stored average callback time and the number of phone calls corresponding to the sender of the call-urgent email, calculates a new average callback time as is described above, stores the new average callback time in the callback time database 99, and adds "1" to the number of phone calls made in reply to call-urgent emails.

Figure 21:
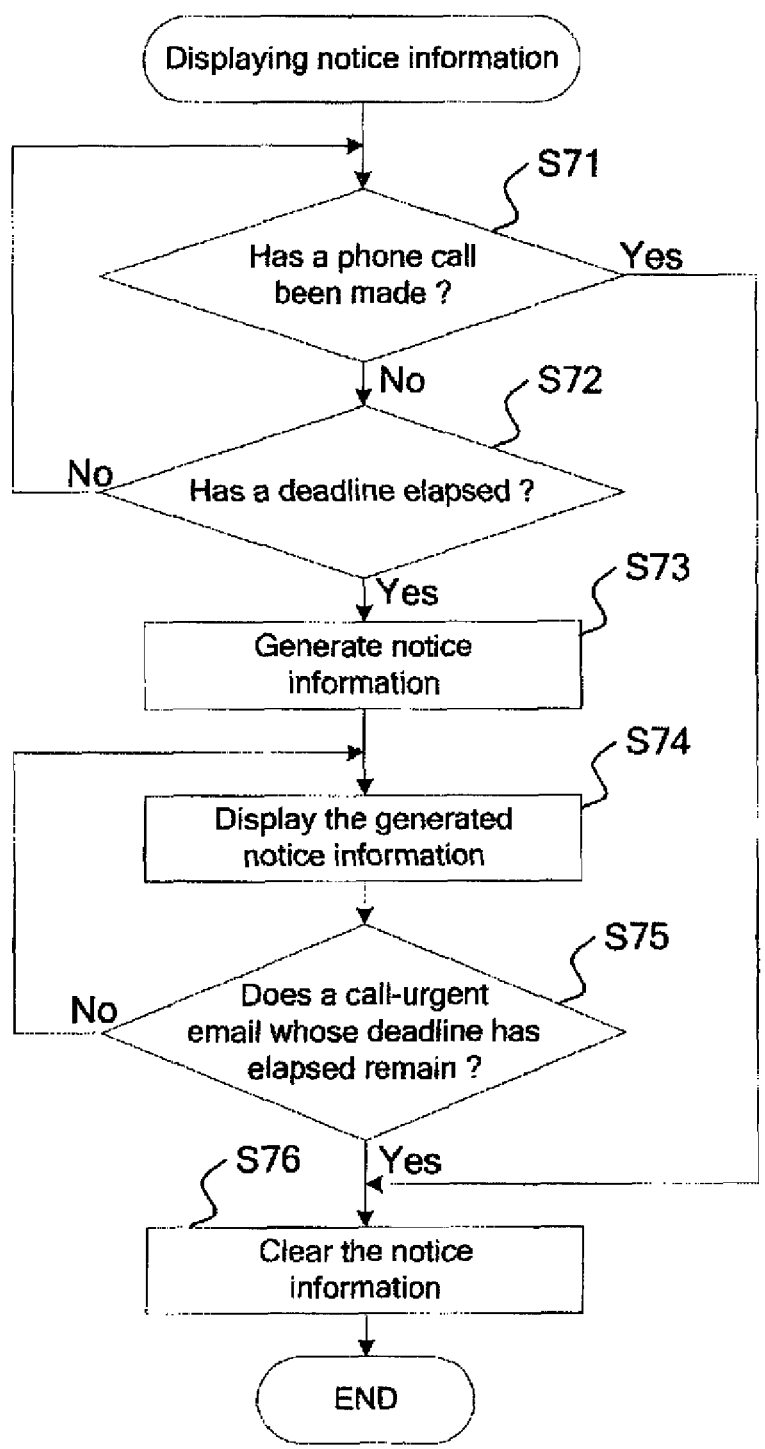
FIG. 21 is a flowchart for explaining processing of displaying notice information.

Next, with reference to FIG. 21, a process to display notice information regarding a call-urgent email whose deadline has elapsed will be explained.

In step S71, the mail management function 54' checks whether a phone call has been made in reply to a call-urgent email in the call-urgent email folder 92. For example, the mail management function 54' may check whether there is call-done information stored with the call-urgent email in the call-urgent email folder 92 showing that the phone call has been made. If the mail management function 54' finds that no call-urgent email is stored in the call-urgent email folder 92 or call-done information is set for all call-urgent emails, the process goes to step S76.

On the other hand, if the mail management function 54' detects that there is at least one call-urgent email without call-done information in the call-urgent email folder 92, the mail management function 54' checks whether its deadline has already elapsed, in step S72. If there is no call-urgent email whose deadline already has elapsed, the process returns to step S71.

In step S73, when the mail management function 54' detects that there is at least one call-urgent email whose deadline has already elapsed, the notice information generating function 63' generates notice information, such as an icon or a pop-up window, so that the user can recognize that there is at least one call-urgent email whose deadline has already elapsed. In step S74, the notice information generating function 63' displays the generated notice information on the display unit 21. The notice information displayed in step S74 corresponds the notice information indicating that there is at least one urgent email whose deadline has already elapsed (described above with respect to the first embodiment), except that the notice information displayed in step S74 indicates the call-urgent email instead of the urgent email. The notice information may be displayed on the sub-display at the same time.

In step S75, the mail management function 54' continues to check whether the call-urgent email whose deadline has already elapsed remains in the call-urgent email folder 92, and keep displaying the notice information on the display unit 21 until no call-urgent email whose deadline has already elapsed is stored in the call-urgent email folder 92.

If the mail management function 54' detects that no call-urgent email whose deadline has already elapsed is stored in the call-urgent email folder 92, the notice information generating function 63' clears the notice information, in step S76.

In the embodiment described above, the user can readily recognize that a call-urgent email has been received on the display unit 21 and can make a phone call to a sender of the call-urgent email with a simple manipulation.

The cellular phone 1, or any other device to which the embodiments of the present invention is applied, performs a portion or all of the processing steps of the above-noted embodiments in response to the control unit 41 or 41' (and its CPU and associated control units) executing one or more sequences of one or more instructions contained in a memory, such as the memory unit 42 or 42'. Such instructions may be read into the memory unit 42 or 42' from another computer readable medium, such as a hard disk or a removable media drive. One or more processors in a multi-processing arrangement may also be employed to execute the sequences of instructions contained in the memory unit 42 or 42'. In alternative embodiments, hard-wired circuitry may be used in place of or in combination with software instructions. Thus, embodiments are not limited to any specific combination of hardware circuitry and software.

As stated above, the cellular phone 1 includes at least one tangible computer readable medium or memory for holding instructions programmed according to the teachings of the above-noted embodiments and for containing data structures, tables, records, or other data described herein. Examples of tangible computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium.

What is claimed is:

1. A mobile communication apparatus, comprising:
an interface configured to communicate with a base station;
a display unit configured to display information;
an input device configured to input instructions;
a memory unit configured to store emails, a phonebook database including a plurality of sets of a telephone number, an email address, and a name, and a keyword database including at least one keyword or phrase;
a control unit configured to compare each word and phrase in a message in a received email with the at least one keyword or phrase in the keyword database, determine that the received email is an urgent email if the message includes at least one word or phrase coinciding with the at least one keyword or phrase in the keyword database, acquire a required time to reply after receiving the urgent email until a reply email is sent to the sender if the received email is determined to be urgent, calculate an average reply time for a sender of the urgent email based on the acquired required time to reply, display first notice information with the average reply time on the display unit, and perform a communication with a sender of the received email when the displayed first notice information is selected via the key input device, the control unit also being configured to compare a sender email address contained in the received email with the email address in the phonebook database if the received email is determined to be urgent, generates link information between the received email and a telephone number in the phonebook database if the phonebook database stores an email address which coincides with the sender email address, and stores the generated link information in the memory unit in association with the received email determined to be urgent;
a call-urgent email folder which stores the generated link information in the memory unit in association with the received email determined to be urgent; and
an urgent email folder which stores the received email determined to be urgent when the control unit determines that there is no email address which coincides with the sender email address in the phonebook database.

2. The mobile communication apparatus according to claim 1, wherein the memory unit further stores a deadline based on the average reply time database including at least one pair at a keyword or phrase and a deadline based on the average reply time, and the control unit determines that the received email is an urgent email if the message includes at least one word or phrase coinciding with the at least one keyword or phrase in the keyword database or coinciding with the at least one keyword or phrase in the deadline database.

3. The mobile communication apparatus according to claim 1, wherein the control unit assigns a deadline based on the average reply time to the received email that is determined to be urgent.

4. The mobile communication apparatus according to claim 3, wherein the memory unit: further stores a deadline database including at least one pair of a keyword or phrase and a deadline, and if the message in the received email includes at least one word or phrase coinciding with the at least one keyword or phrase in the deadline database, the control unit assigns the deadline stored in the deadline database in a pair with the at least one word or phrase in the message.

5. The mobile communication apparatus according to claim 3, wherein the control unit displays second notice information on the display unit if it is detected that the deadline has elapsed.

6. The mobile communication apparatus according to claim 5, wherein the first and second notice information are icons different from each other in color.

7. The mobile communication apparatus according to claim 1, wherein the control unit performs a communication based on the telephone number linked to the received email by the generated link information, if a request for communication with a sender of the received email is inputted via the key input device.

8. A mobile communication apparatus, comprising:
an interface configured to communicate with a base station;
a display unit configured to display information;
an input device configured to input instructions;
a memory unit configured to store emails, a phonebook database including a plurality of sets of a telephone number, an email address, and a name, and a keyword database including at least one keyword or phrase;
a control unit including a processor and a non-transitory recording medium which is configured to:
compare each word and phrase in a message in a received email with the at least one keyword or phrase in the keyword database,
determine that the received email is an urgent email if the message includes at least one word or phrase coinciding with the at least one keyword or phrase in the keyword database,
compare a sender email address contained in the received email with the email address in the phonebook database if the received email is determined to be urgent, and
generate link information between the received email and a telephone number in the phonebook database if the phonebook database stores an email address which coincides with the sender email address;
a call-urgent email folder which stores the generated link information in the memory unit in association with the received email determined to be urgent;
an urgent email folder which stores the received email determined to be urgent when the control unit determines that there is no email address which coincides with the sender email address in the phonebook database,
wherein the control unit is further configured to:

acquire a required time to reply after receiving the urgent email until a reply email is sent to the sender if the received email is determined to be urgent,
calculate an average reply time for a sender of the urgent email based on the acquired required time to reply,
display first notice information with the average reply time on the display unit, and
perform a communication with a sender of the received email when the displayed first notice information is selected via the key input device.

9. The mobile communication apparatus according to claim 8, wherein the memory unit further stores a deadline database based on the average reply time database including at least one pair of a keyword or phrase and a deadline based on the average reply time, and wherein control unit of the mobile communication apparatus is further configured to:
determine that the received email is an urgent email if the message includes at least one word or phrase coinciding with the at least one keyword or phrase in the keyword database or coinciding with the at least one keyword or phrase in the deadline based on the average reply time database.

10. The mobile communication apparatus according to claim 8, wherein the control unit is further adapted to assign a deadline based on the average reply time to the received email that is determined to be urgent.

11. The mobile communication apparatus according to claim 10, wherein the memory unit further stores a deadline database including at least one pair of a keyword or phrase and the deadline based on the average reply time, and if the message in the received email includes at least one word or phrase coinciding with the at least one keyword or phrase in the deadline database, the deadline being assigned based on the average reply time stored in the deadline database in a pair with the at least one word or phrase in the message.

12. The mobile communication apparatus according to claim 10,
wherein the control unit displays second notice information on the display unit if it is detected that the deadline has elapsed.

13. The mobile communication apparatus according to claim 12, wherein the first and second notice information are icons different from each other in color.

14. The mobile communication apparatus according to claim 10, wherein the memory unit further stores a reply time database that includes at least one pair of a sender and an average reply time between receipt of an urgent email from the sender and sending of a reply email; and
wherein the control unit assigns the average reply time corresponding to the sender of the received urgent email as the deadline.

15. The mobile communication apparatus according to claim 8,
wherein the control unit is further configured to perform communication based on the telephone number linked to the received email by the generated link information, if a request for communication with a sender of the received email is inputted via the key input device.

* * * * *